US010542118B2

(12) United States Patent
Ekström et al.

(10) Patent No.: US 10,542,118 B2
(45) Date of Patent: Jan. 21, 2020

(54) FACILITATING DYNAMIC FILTERING AND LOCAL AND/OR REMOTE PROCESSING OF DATA BASED ON PRIVACY POLICIES AND/OR USER PREFERENCES

(71) Applicant: INTEL CORPORATION, Santa Clara, CA (US)

(72) Inventors: Jan Ekström, Helsinki (FI); Ismo Puustinen, Helsinki (FI); Jaska Uimonen, Helsinki (FI)

(73) Assignee: INTEL CORPORATION, Santa Clara, CA (US)

( * ) Notice: Subject to any disclaimer, the term of this patent is extended or adjusted under 35 U.S.C. 154(b) by 917 days.

(21) Appl. No.: 14/864,752

(22) Filed: Sep. 24, 2015

(65) Prior Publication Data

US 2017/0094018 A1 Mar. 30, 2017

(51) Int. Cl.
*H04L 29/08* (2006.01)
*H04W 4/60* (2018.01)
(Continued)

(52) U.S. Cl.
CPC ............ *H04L 67/327* (2013.01); *G08B 13/00* (2013.01); *H04L 67/10* (2013.01); *H04L 67/12* (2013.01);
(Continued)

(58) Field of Classification Search
CPC ............ A01K 11/008; G06F 17/30867; G06F 17/3225; G06F 19/327; G06F 19/3418; G06F 21/566; G06F 21/6245; G06F 3/0481; G06Q 20/027; G07C 5/008; H04L 45/14; H04L 63/104; H04L 9/008; H04L 63/0272; H04L 67/10; H04L 67/12; H04L 67/20; H04L 67/306; H04L 67/327; G08B 13/00;
(Continued)

(56) References Cited

U.S. PATENT DOCUMENTS 7,292,956 B1 * 11/2007 Guday .................. G16H 15/00
702/118
9,118,689 B1 * 8/2015 Apte ..................... H04L 63/104
(Continued)

OTHER PUBLICATIONS

PCT Application No. PCT/US2016/044778, Notification Concerning Transmittal of International Preliminary Report on Patentability, dated Apr. 5, 2018, 5 pgs.
(Continued)

*Primary Examiner* — Le H Luu
(74) *Attorney, Agent, or Firm* — Womble Bond Dickinson (US) LLP

(57) ABSTRACT

A mechanism is described for facilitating smart filtering and local/remote processing of data according to one embodiment. A method of embodiments, as described herein, includes detecting data collected via one or more sensing components, and evaluating the collected data to identify one or more portions of the collected data having privacy relevance, where evaluating further includes classifying the one or more portions as private data and other portions of the collected as non-private data. The method may further include filtering out the private data from the non-private data of the collected data, and processing the private data, where the non-private data is transmitted to a remote computing device over a network.

25 Claims, 7 Drawing Sheets

(51) Int. Cl.
  *H04W 4/90* (2018.01)
  *G08B 13/00* (2006.01)
  *H04W 4/70* (2018.01)
  *H04W 8/16* (2009.01)
(52) U.S. Cl.
  CPC ............ *H04L 67/20* (2013.01); *H04L 67/306* (2013.01); *H04W 4/60* (2018.02); *H04W 4/70* (2018.02); *H04W 4/90* (2018.02); *H04W 8/16* (2013.01)
(58) Field of Classification Search
  CPC ........... H04W 4/60; H04W 4/70; H04W 4/90; H04W 8/16
  See application file for complete search history.

(56) References Cited

U.S. PATENT DOCUMENTS

| | | | | |
|---|---|---|---|---|
| 2005/0065711 | A1* | 3/2005 | Dahlgren | G07C 5/008 701/117 |
| 2010/0088313 | A1* | 4/2010 | Hoffman | G06F 17/30867 707/733 |
| 2011/0041178 | A1* | 2/2011 | Jakobsson | G06F 21/566 726/22 |
| 2012/0213359 | A1* | 8/2012 | Troncoso Pastoriza | H04L 9/008 380/28 |
| 2012/0222083 | A1 | 8/2012 | Vaha-Sipila et al. | |
| 2012/0331567 | A1* | 12/2012 | Shelton | G06F 21/6245 726/28 |
| 2013/0057388 | A1 | 3/2013 | Attanasio | |
| 2013/0290305 | A1 | 10/2013 | Feng et al. | |
| 2013/0310156 | A1* | 11/2013 | Gadher | G07F 17/3225 463/25 |
| 2014/0082745 | A1* | 3/2014 | Guedalia | G06F 3/0481 726/27 |
| 2014/0123208 | A1 | 5/2014 | Plagemann et al. | |
| 2014/0157349 | A1 | 6/2014 | Robinson et al. | |
| 2014/0244296 | A1* | 8/2014 | Linn | G06F 19/322 705/3 |
| 2015/0143504 | A1* | 5/2015 | Desai | H04L 45/14 726/13 |
| 2015/0170141 | A1* | 6/2015 | Klingen | G06Q 20/027 705/41 |
| 2016/0180060 | A1* | 6/2016 | Nelson | A01G 22/00 702/19 |
| 2017/0249432 | A1* | 8/2017 | Grantcharov | H04L 63/0272 |

OTHER PUBLICATIONS

Notification of Transmittal of the International Search Report and the Written Opinion of the International Searching Authority issued for International Patent Application No. PCT/US2016/044778, dated Nov. 11, 2016.

* cited by examiner

US 10,542,118 B2

FACILITATING DYNAMIC FILTERING AND LOCAL AND/OR REMOTE PROCESSING OF DATA BASED ON PRIVACY POLICIES AND/OR USER PREFERENCES

FIELD

Embodiments described herein generally relate to computers. More particularly, embodiments relate to facilitating dynamic filtering and local and/or remote processing of data based on privacy policies and/or user preferences.

BACKGROUND

In the Internet of Things (IoT) domain, data is often gathered from local sensors and sent to cloud services for processing without having the sense for whether the data being sent for processing includes any information that may be regarded as private, sensitive, etc. Conventional techniques are severely limited and inefficient as such techniques either send all data to be processed remotely or process all data locally.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
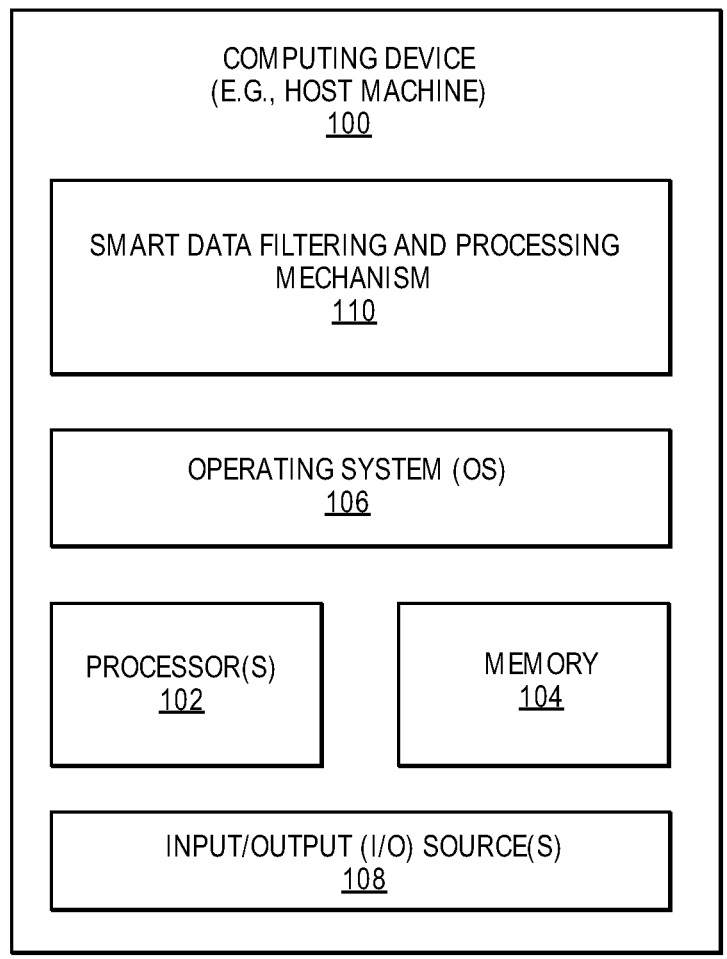
FIG. 1 illustrates a computing device employing a smart data filtering and processing mechanism according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a novel technique for detecting and identifying sensitivity within data that is to be processed remotely at a remote processing system, such as a cloud-based data processing system or server computer, where the novel technique is further to separate one or more sensitive portions of the data from one or more non-sensitive portions of the data such that the one or more non-sensitive portions are sent over to be processed at the remote processing system while the one or more sensitive portions of the data are processed locally at a local computer, such as an IoT device, mobile computing device, wearable smart device, etc. Further, in one embodiment, the remote processing system is appropriately notified regarding the possible partial nature of the data (being received for remote processing) due to local privacy processing.

As previously described, in various cases, such as in an IoT domain, data is gathered at local IoT devices (e.g., home security device, burglar alarm system, washing machine, light panel, garden sprinkler system, etc.) using the IoT devices' sensors, detectors, etc., where this locally-gathered data often includes portions that may be regarded as sensitive or private and not ideal for transmitting over one or more networks and/or processing at a remote processing system. Although, for example, a cloud-based processing system may offer better overall computational results compared to a local computation and allow for storage of large amounts of data for various additional purposes, such as analytics, which may be beneficial for the user in the long-term; nevertheless, not at the cost of sacrificing the users' privacy.

For example, as will be illustrated and further described with reference to FIG. 3, with regard to a home security IoT device (e.g., burglar detection device, etc.), some of the data gathered at the home security device may include any amount and type of sensitive data (e.g., homeowner/residents' voices, fingerprints, departure/arrival schedule, codes, dates of birth, etc.) that may be regarded as private for the safety and security of the residents. In one embodiment, this private data may then be separated from the rest of the data that is regarded as public/non-private/non-sensitive (e.g., light turning on/off, random movements, etc.) and accordingly, in one embodiment, the private data is processed locally, while the non-private data is sent over to the remote processing system to be processed there.

It is contemplated and to be noted that embodiments are not limited to any particular number and type of software applications, application services, customized settings, etc., or any particular number and type of computing devices, networks, deployment details, etc.; however, for the sake of brevity, clarity, and ease of understanding, throughout this document, references are made to body dimensions, measurements, tracking, progress, 3D models, user interfaces, software applications, user preferences, customized settings, mobile computers (e.g., smartphones, tablet computers, etc.), communication medium/network (e.g., cloud network, proximity network, the Internet, etc.), but that embodiments are not limited as such.

Figure 2:
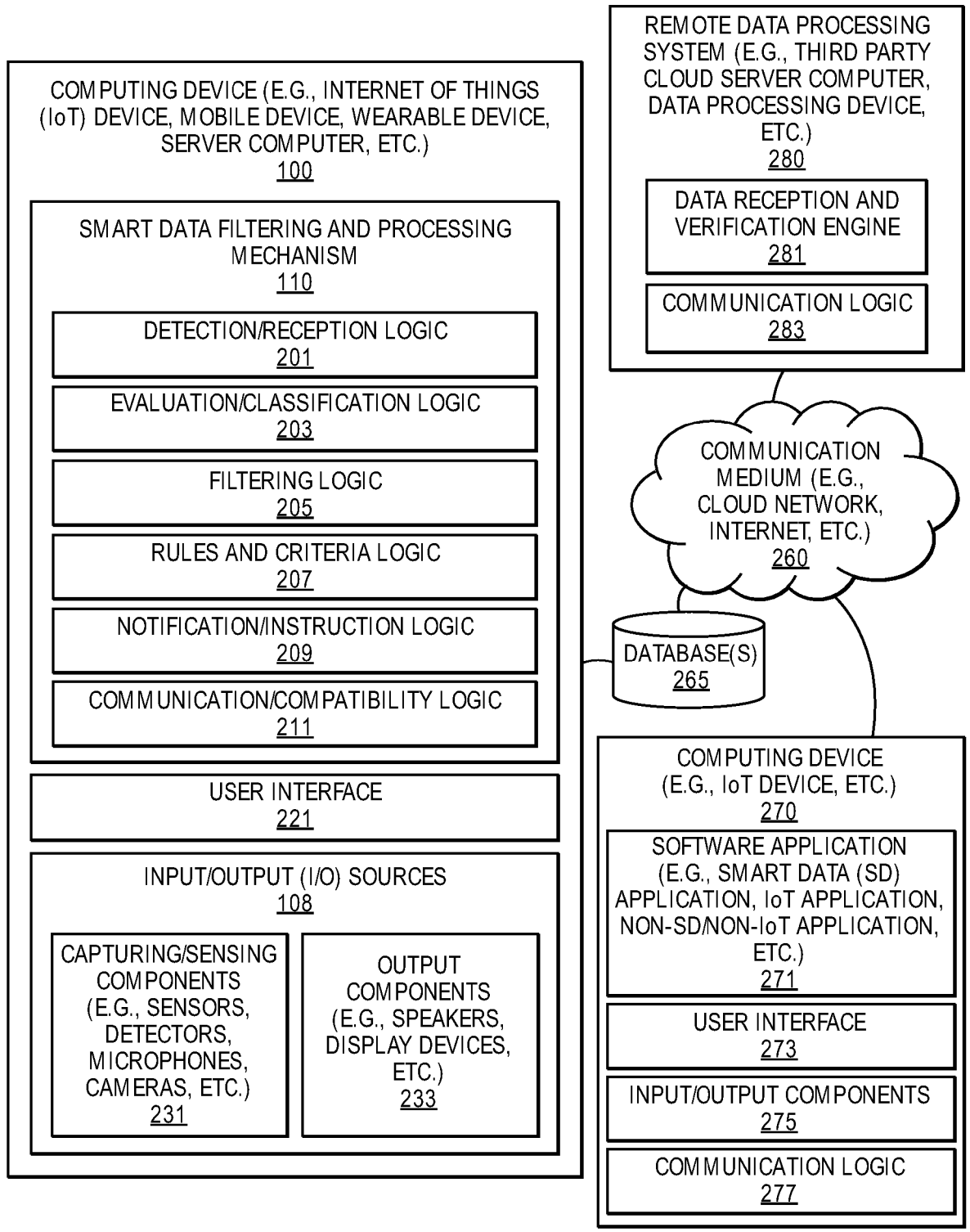
FIG. 2 illustrates a smart data filtering and processing mechanism according to one embodiment.

FIG. 1 illustrates a computing device 100 employing a smart data filtering and processing mechanism 110 according to one embodiment. Computing device 100 serves as a host machine for hosting smart data filtering and processing mechanism ("smart data mechanism") 110 that includes any number and type of components, as illustrated in FIG. 2, to facilitate intelligent, dynamic, and automatic identifying, filtering, and separating of portions of data and processing of private portions of the data locally and non-private portions of the data remotely, as will be further described throughout this document.

Computing device 100 may include any number and type of data processing devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, head-mounted displays (HMDs) (e.g., wearable glasses, such as Google® Glass™, head-mounted binoculars, gaming displays, military headwear, etc.), and other wearable devices (e.g., smart watches, bracelets, smartcards, jewelry, clothing items, etc.), and/or the like.

Computing device 100 may include an operating system (OS) 106 serving as an interface between hardware and/or physical resources of the computer device 100 and a user. Computing device 100 further includes one or more processor(s) 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a person or a group of individuals or persons using or having access to computing device 100.

FIG. 2 illustrates a smart data filtering and processing mechanism 110 according to one embodiment. In one embodiment, smart data mechanism 110 may include any number and type of components, such as (without limitation): detection/reception logic 201; evaluation/classification logic 203; filtering logic 205; rules and criteria logic 207; notification/instruction logic 209; and communication/compatibility logic 211. Computing device 100 is further shown as offering user interface 221 and hosting input/output sources 108 having capturing/sensing components 231 (e.g., sensors, detectors, microphones, etc.) and output sources 233 (e.g., display devices, speakers, etc.).

In one embodiment, smart data mechanism 110 may be hosted by computing device 100, such as a data processing/communication device including an IoT device (e.g., home security system, thermostat, washer/dryer, light panel, sprinkler system, etc.), a mobile computer (e.g., smartphone, tablet computer, etc.), wearable computer (e.g., wearable glasses, smart bracelets, smartcards, smart watches, HMDs, etc.), and/or the like. In another embodiment, computing device 100 may be a larger communication machine, such as a server computer, a desktop computer, a laptop computer, etc., that is in communication with one or more computing devices, such as computing device 270 (e.g., IoT device, mobile device, wearable device, etc.) and remote data processing system ("remote processing system" or simply "remote system") 280 (e.g., third-party computing device, such as a cloud server computer, cloud-based data processing system, etc.), etc., over communication medium 260, such as one or more networks (e.g., Cloud network, the Internet, proximity network, such as Bluetooth, etc.).

For example and in one embodiment, computing device 100 may serve as a server computer hosting smart data mechanism 110 in its entirety while communicating one or more services offered by smart data mechanism 110 with one or more personal devices, such as computing device 270, over communication medium 260, such as a cloud network. In another embodiment, computing device 100 itself may be another personal device, such as similar to or the same as computing devices 270, where each computing device 100, 270 may include smart data mechanism 110, either partially or entirely, as part or in support of a software application, such as software application 271. In one embodiment, software application 271 may include a smart data (SD)-based application, an IoT application, a non-SD/non-IoT application (e.g., web browser, etc.), etc.

For example, in case of software application 271 being a non-SD application, computing device 270 may provide certain communication/data processing features or components user interface 273 (e.g., mobile/IoT application-based interface, web browser, etc.), I/O components 275, communication logic 277, etc., but rely on one or more components of smart data mechanism 110 at computing device 100 for further processing. For example and in one embodiment, in case of software application 271 being an SB application (such as downloadable or accessible over communication medium 260), software application 271 may be the same as or similar to smart data mechanism 110 (such as having one or more components of smart data mechanism 110) making it capable of performing one or more tasks of smart data mechanism 110 at computing device 270.

In one embodiment, software application 271 may be capable of interacting with smart data mechanism 110, via communication logic 277, over communication medium 260, while a user may access software application 271 via user interface 273 (e.g., mobile/IoT application interface, web browser, etc.). Further, as with computing device 100, computing device 270 may include I/O components 275, such as (without limitation) sensors, detectors, actuators, microphones, speakers, 2D/3D cameras, touchscreens, display devices, and/or the like.

Computing devices 100, 270, 280 may be further in communication with one or more repositories or data sources or databases, such as database(s) 265, to obtain, communicate, store, and maintain any amount and type of data (e.g., sensed/detected data, private IoT data, non-private IoT data, data tables, data maps, media, metadata, templates, real-time data, historical contents, user and/or device identification tags and other information, resources, policies, criteria, rules, regulations, upgrades, profiles, preferences, configurations, etc.).

In some embodiments, communication medium 260 may include any number and type of communication channels or networks, such as cloud network, the Internet, intranet, Internet of Things ("IoT"), proximity network, such as Bluetooth, etc. It is contemplated that embodiments are not limited to any particular number or type of computing devices, services or resources, databases, networks, etc.

In one embodiment, I/O source(s) 108 include capturing/sensing component(s) 231 and output component(s) 233 which, as will be further described below, may include any number and type of I/O components, such as sensor arrays, detectors, displays, etc. For example, capturing/sensing components 231 may include (without limitations) sensor array (such as context/context-aware sensors and environmental sensors, such as camera sensors, ambient light sensors, Red Green Blue (RGB) sensors, movement sensors, etc.), depth-sensing cameras, 2D cameras, 3D cameras, image sources, audio/video/signal detectors, microphones, eye/gaze-tracking systems, head-tracking systems, etc. Similarly, for example, output components 233 may include (without limitation) audio/video/signal sources, display planes, display panels, display screens/devices, projectors, display/projection areas, speakers, etc.

Capturing/sensing components 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., finger prints, etc.), brainwaves, brain circulation, environmental/weather conditions, maps, etc. It is contemplated that "sensor" and "detector" may be referenced interchangeably throughout this document. It is further contemplated that one or more capturing/sensing components 231 may further include one or more of supporting or supplemental devices for capturing and/or sensing of data, such as illuminators (e.g., infrared (IR) illuminator), light fixtures, generators, sound blockers, etc.

It is further contemplated that in one embodiment, capturing/sensing components 231 may further include any number and type of context sensors (e.g., linear accelerometer) for sensing or detecting any number and type of contexts (e.g., estimating horizon, linear acceleration, etc., relating to a mobile computing device, etc.). For example, capturing/sensing components 231 may include any number and type of sensors, such as (without limitations): accelerometers (e.g., linear accelerometer to measure linear acceleration, etc.); inertial devices (e.g., inertial accelerometers, inertial gyroscopes, micro-electro-mechanical systems (MEMS) gyroscopes, inertial navigators, etc.); gravity gradiometers to study and measure variations in gravitation acceleration due to gravity, etc.

Further, for example, capturing/sensing components 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.), biometric sensors (such as to detect fingerprints, etc.), calendar maintenance and reading device), etc.; global positioning system (GPS) sensors; resource requestor; and trusted execution environment (TEE) logic. TEE logic may be employed separately or be part of resource requestor and/or an I/O subsystem, etc. Capturing/sensing components 231 may further include voice recognition devices, photo recognition devices, facial and other body recognition components, voice-to-text conversion components, etc.

Similarly, for example, output components 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output components 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

In one embodiment, computing device 100 may be an IoT device, such as a home security system, that is capable of actively collecting data, such as a resident/guest/pet-related data (e.g., speech/audio, video, fingerprints, facial features, planned movements, random movement, arrivals/departure timings, pet movements, pet walking timings, human/pet identifiable and/or private features and contexts, etc.), property-related data (e.g., house temperature, opening/closing of windows and/or doors, sprinkler timings, external/internal lighting, etc.), device-related data (e.g., turning on/off of alarm system, secret code, device brand/age, etc.), and/or the like.

In one embodiment, one or more sensors/detectors of a sensor array of capturing/sensing components 231 may be used to sense or detect various scenarios or portions of data relating to the user, property, device, etc., from the aforementioned data so that determination may be as to whether a scenario is to be regarded as private/sensitive or non-private/non-sensitive. As will be further described by classifying various portions of data as private or non-private, merely the non-private data may be sent over to remote processing device 280 for further processing, while private data may be processed locally at computing device 100.

In one embodiment, once the data is gathered via one or more sensors, detectors, cameras, etc., of capturing/sensing components 231 of computing device 100, evaluation/classification logic 203 is triggered to then thoroughly evaluate each piece of the gathered data to detect and evaluate various scenarios relating to the gathered data. For instance, continuing with the home security IoT system/device being computing device 100, a scenario relating to a portion of the data may reveal speech/audio of one or more users (e.g., homeowner's voice, children's audio, etc.), videos of one or more users (e.g., private videos, such as a resident changing clothes, a guest who may not want others to know they visited the house, etc.), etc., may be classified as private portions of the gathered data by evaluation/classification logic 203.

In one embodiment, whether a portion of data is to be classified as private or non-private may be based on one or more rules, policies, profiles, preferences, etc., as defined and provided by rules and criteria logic 207. For example, a policy may define any captured user audio and video to be classified as private data regardless of the content of the audio/video. Similarly, for example, scenarios like users' planned movements (such as routine arrival time, departure time, meeting times, school time, etc.) may be regarded as private, while other scenarios like their unplanned movements (such as going to the garage, getting up to drink water, unknown guests (e.g., vendors, mailmen, etc.) may be regarded as non-private. Accordingly, in one embodiment, evaluation/classification logic 203 may access and use such definitions provided by rules and criteria logic 207 to classify various data portions as private or non-private.

For example, in one embodiment, users may generate their personal profiles or set preferences to define what type of data is to be classified as private and non-private. These profiles, preferences, etc., may be by inputted or modified by users via user interface 221, as facilitated by rules and criteria logic 207, and stored at one or more repositories, such as database(s) 265. In additional to personal profiles and preferences, certain default rules, policies, conditions, exceptions, etc., may also be access and maintained using rules and criteria logic 207 and stored at database(s) 265. For example, rules and criteria logic 207 may define a default policy/rule that explicitly defines that all speech, pictures, videos, etc., that reveals private body parts or intimate speech of users are to be regarded and classified as private and processed locally at computing device 100. However, rules and criteria logic 207 may further define an exception to the aforementioned default rule when there is an emergency of some sort, such as a medical emergency automatically waives the default rule regarding not revealing private body parts, etc., where such portions of data may be transmitted and processed remotely and more efficiently at remote processing system 280.

Once various portions of the gathered data are classified as private or non-private, in one embodiment, filtering logic 205 may then be triggered to separate the two classified sets of data or filter out one classified set of data from the collected data. In one embodiment, a first set of data that is classified as private is filtered out by filtering logic 205 so that this private set of data may be processed locally at computing device 100, where this set of private data is not transmitted over to remote processing system 280. Similarly, in one embodiment, a second set of data that is classified as non-private may be fine being processed remotely and thus, this set of non-private data is communicated over to remote processing system 290 (e.g., third-party cloud-based server computer, etc.) over communication medium 260 (e.g., cloud network) without having to endanger any sensitive or secret data relating to one or more of users, pets, properties, devices, etc.

Once various portions of the collected data are classified as private or non-private as facilitated by evaluation/classification logic 203 and the non-private portion is filtered out from the data and separated from the private portion as facilitated by filtering logic 205, notification/instruction logic 209 may then be triggered to ensure that when receiving the non-private data, remote processing system 280 also receives a notification or a set of instruction relating to the non-private data in light of any relevant rules, policies, profiles, preferences, etc., as facilitated by rules and criteria logic 207. In one embodiment, notification/instruction logic 209 issues and provides, via communication/compatibility logic 211, such notification/instruction to remote processing system 280 to safeguard against any incorrect decisions or accidental processes, such as if any private portion of the data gets transmitted to remote processing system 280.

As illustrated, in one embodiment, remote processing system 280 is shown as hosting data reception and verification engine 281 which receives, via communication logic 283, and verifies each piece of data (e.g., non-private data) that is received from one or more computing devices 100, 270 (e.g., IoT devices) such that, for example, if any private data is found to have been received, data reception verification engine 281 is triggered to block or reject that private data based on the corresponding notification and/or set of instructions. This is further to instruct remote processing system 280 regarding the nature of the non-private portion of the data it has received, such as why it might be missing the other relevant private portion of the data, etc.

Further, data reception and verification engine 281 instructs communication engine 283 to transmit the rejected private data back to its corresponding transmitting device, such as computing device 100 and/or 270, for further processing. Stated differently, this data verification at remote processing system 280 provides additional protection against any communication (such as communication that may be regarded as accidental, unintentional, unavoidable, etc.) of private data over communication medium 260 so that it may safely and privately processed at a local computing device, such as computing device 100, 270.

Further, in one embodiment, remote processing system 280 may be notified and instructed, as facilitated by notification/instruction logic 209, that the data being received at remote processing system 280 merely includes the non-private portion and limited via its protocol and thus remote processing system 280 may be allowed to optimize its routines for both the short and long term processing and analytics. In one embodiment, notifications and/or instructions may be used to keep any remote processing-based decision making to be 1) correct, such as preventing the remote processing to be based on any wrong data (e.g., assuming there is no one in the room when the data containing speech was removed, etc.) and 2) complete, such as letting the remote cloud service logs to show that the privacy/sensitive data processing was done locally. Further, this notification/instruction technique may be performed using requests (e.g., Hypertext Transfer Protocol (HTTP) and/or MQ Telemetry Transport (MQTT) (e.g., machine 2 machine (M2M)/IoT connectivity protocol) requests) from an IoT gateway to remote processing system 280 as illustrated with regard to FIG. 3. For example, the first request may inform remote processing system 280 that privacy filtering is taking place on an array of sensors due to privacy reasons and a string describing the reasons for logging purposes. Another request informs remote processing system 280 that privacy filtering has now ended and provides any results of the local processing or computation to remote processing system 280.

Further, in one embodiment, the private data that is not transmitted to remote processing system 280 may be processed locally at computing device 100, where this local processing of the private data generates results. In one embodiment, evaluation/classification logic 203 may yet again be triggered to analyze whether these results can be classified as non-private or summarize the results into a set of non-private data points or extract non-private sub-portions of the data from the private portion of the data, then, in one embodiment, communication/compatibility logic 211 may be used to transmit one or more of non-private results, non-private data points, and/or non-private data points to remote processing system 280 for analytics to be used with the relevant non-private data at remote processing system 280. If, however, the results and/or the results data points are still regarded as private by evaluation/classification logic 203, then the results and/or the results data points remain classified as private and are filtered out of the rest of the data as facilitated by filtering logic 205. This technique allows for keeping the data received at remote processing system 280 to be as complete as possible without having to comprise on any private contents while preventing any potential data mining results, logs, etc., from being affected by the privacy filtering as facilitated by smart data mechanism 110.

Moreover, in one embodiment, in order to better classify and filter certain portions of the gathered data, evaluation/classification logic 203 and filtering logic 205 may work together to detect various scenarios from the data (e.g., detecting a source of a portion of data, such as a camera, a microphone, a sensor, etc. of capturing/sensing components 231) covering a specific domain or a mix or combination of domains. For example, a cross-domain case may include a combination of camera-based data relating to the video domain and microphone-based data relating to the audio domain, where if, for example, the combination of the camera-based data and the microphone-based data violates privacy, but not when the two data forms are reviewed separately, then, in such a case, evaluation/classification logic 203 may still decide to trigger a privacy-threating scenario such that both the camera-based data and the microphone-based data are regarded as private and processed locally, such as at computing device 100, ensuring nothing private is processed remotely.

Stated differently, in one embodiment, filtering of gathered data may be performed across multiple domains, such as audio domain, video domain, light domain, motion domain, etc., and if there is some data found in one of the domains where the data may not be regarded as private when it remains in a single domain (such as human speech in audio domain) but becomes private when combined with another domain (such as human video in video domain that corresponds to the human speech in audio domain), the relevant data from both domains may then be classified as private by evaluation/classification logic 203 of FIG. 2 and filtered out, by filtering logic 205 of FIG. 2, from the sensed data to be processed locally.

Further, in one embodiment, such scenarios overlapping multiple domains, may activate partial or full filtering (also referred to as "blocking" or "separating") of data, as facilitated by filtering logic 205, from specific sensors that would otherwise be sent to a cloud service, such as remote processing system 280, over a cloud network, such as communication medium 260, for further processing. In some embodiments, the amount of filtering may depend both on filtering capabilities of a local processing unit, such as at computing device 100, as well as communication and processing capabilities of the remote service, such as remote processing system 280.

In one embodiment, evaluation/classification logic 203 and/or filtering logic 205 may be powered by one or more components, such as a policy or decision engine having multiple input data sources that are represented by plugins. These plugins may provide data to evaluation/classification logic 203 and/or filtering logic 205 having access to rules, policies, etc., via policies and rules and criteria logic 207, that are tailored to processing cross-domain data from multiple sources, such as audio sensors, video sensors, etc., of capturing/sensing components 231. Further, for example, current state of this sensor network may be maintained a repository, such as database(s) 265, where the events may cause the data being matched against rules, policies, etc., at database(s) 265, that are written in a domain-specific language (e.g., Lua-based and open to other configurations, etc.), leading to decisions and further updates to the system state in database(s) 265. For example, any cross-domain aspect may come from a rule network being capable of processing data in a domain-independent manner, wherein this rule network may be instantiated by the configuration, such as configuration 303 of FIG. 3. This resulting decision of evaluation/classification 203 and filtering logic 205 may then be sent to a domain controller that enforces the decision (such as the decision to start filtering out the private/non-private data from the overall gathered data, etc.).

Communication/compatibility logic 211 may be used to facilitate dynamic communication and compatibility between computing devices 100, 270, 280, database(s) 265, communication medium 260, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, the Internet, Internet of Things, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", and the like, may be referenced interchangeably and include, by way of example, software, hardware, and/or any combination of software and hardware, such as firmware. Further, any use of a particular brand, word, term, phrase, name, and/or acronym, such as "privacy", "secrecy", "private", "non-private", "sensitive", "secretive", "public", "data", "portions or segments of data", "gathering or collecting of data", "sensors", "detectors", "user", "user profile", "user preference", "rule", "policy", "sender", "receiver", "personal device", "smart device", "mobile computer", "wearable device", "cloud device", "cloud-based server computer", "third-party server computer", "remote processing system", etc., should not be read to limit embodiments to software or devices that carry that label in products or in literature external to this document.

It is contemplated that any number and type of components may be added to and/or removed from smart data mechanism 110 to facilitate various embodiments including adding, removing, and/or enhancing certain features. For brevity, clarity, and ease of understanding of smart data mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3:
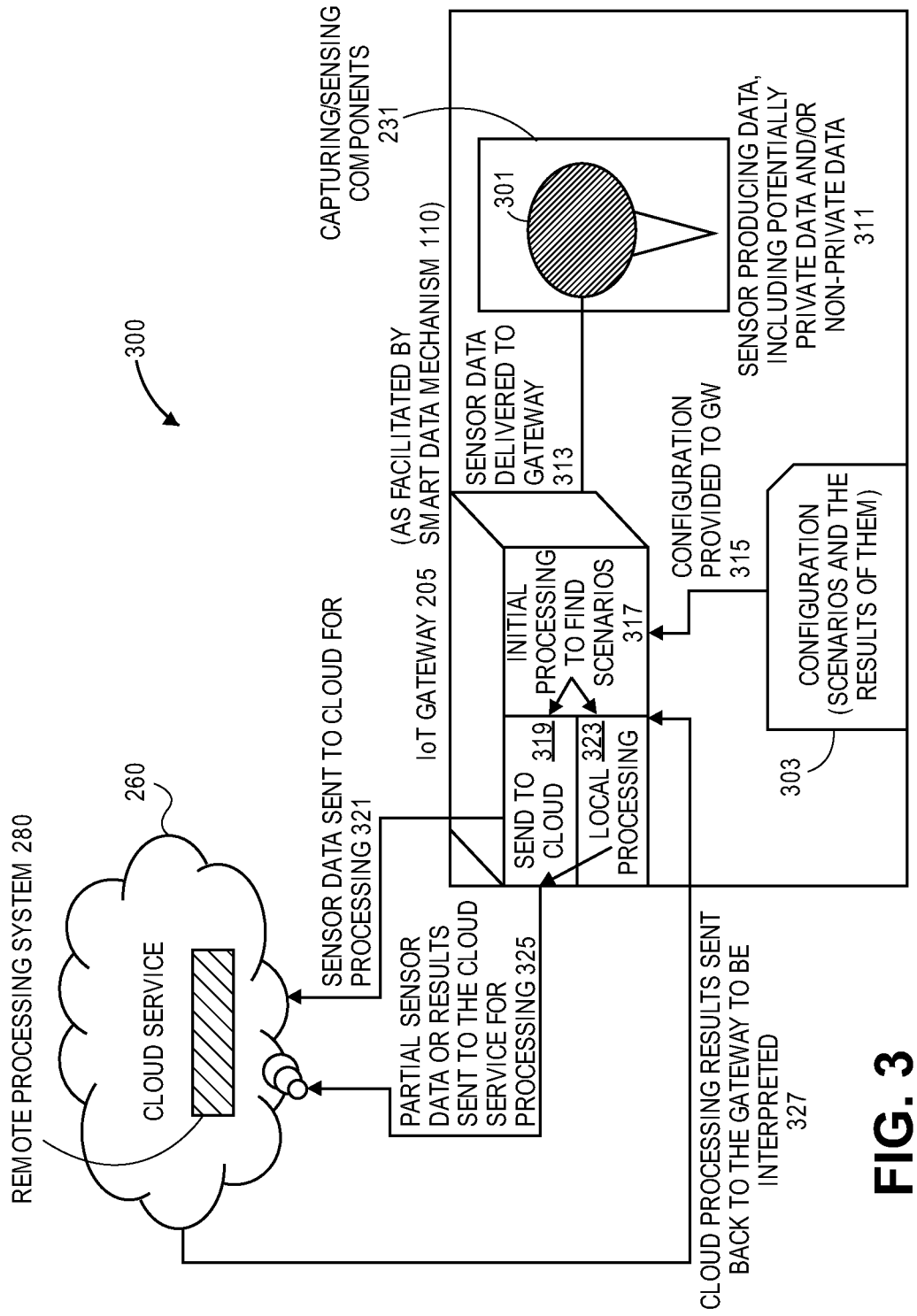
FIG. 3 illustrates a transaction sequence for facilitating filtering and local/remote processing of data according to one embodiment.

FIG. 3 illustrates a transaction sequence 300 for facilitating filtering and local/remote processing of data according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed by smart data mechanism 110 of FIGS. 1-2. The processes of transaction sequence 300 are illustrated in linear sequences for brevity and clarity in presentation; however, it is contemplated that any number of them can be performed in parallel, asynchronously, or in different orders. For brevity, many of the details discussed with reference to the previous FIGS. 1-2 may not be discussed or repeated hereafter.

Transaction sequence 300 is shown as using the illustrated architectural setup but it is contemplated and to be noted that embodiments are not limited to any particular architectural setup and devices, components, networks, etc., may be arranged to communicate in any arrangement and/or order. In one embodiment, as illustrated, transaction sequence 300 begins with sensing or detecting of data that includes potential private data and/or non-private data at 311 by one or more capturing/sensing components 231, such as an audio sensor/microphone 301, of computing device 100 of FIG. 2, such as computing device 100 being a home security system and microphone 301 being the home security system's audio sensor that is mounted on a wall of a house. This sensed data is then delivered to a architecture-based control unit or a gateway, such as IoT gateway 305, where, as facilitated by one or more components of smart data mechanism 110, initial processing of the sensed data is performed at 317 to find various scenarios (such as "human speech being found", etc.) to determine whether there are any private portions and/or public/non-private portions of the sensed data. In one embodiment, various scenarios, rules, policies, profiles, preferences, results of local and/or remote data processing, etc., may be provided or offered through configuration 303.

Upon finding such scenarios that indicate private and/or non-private portions of the sensed data as analyzed and classified by evaluation/classification logic 203, filtering logic 205 of FIG. 2 is triggered to separate the private portions (e.g., specific human speech) from the non-private portions (e.g., other background sounds, traffic noise, neighborhood children playing, etc.) or filter out the private portions of the data from the rest of the sensed data due to privacy concerns. In one embodiment, at 319, any non-private portions of the sensed data are classified as non-private/public data and set for transmission over to remote processing system 280 (e.g., cloud-based processing system) over communication medium 260 (e.g., cloud network) and subsequently, at 321, the non-private data is transmitted over to remote processing system 280 for further processing.

In one embodiment, as aforementioned, this filtering of the sensed data may also be performed across multiple domains, such as audio domain, video domain, animation domain, etc., and if there is some data found in one of the domains where the data may not be regarded as private when it remains in a single domain (such as human speech in audio domain) but becomes private when combined with another domain (such as human video in video domain that corresponds to the human speech in audio domain), the relevant data from both domains may then be classified as private by evaluation/classification logic 203 of FIG. 2 and filtered out, by filtering logic 205 of FIG. 2, from the sensed data to be processed locally.

Further, in one embodiment, remote processing system 280 may be notified and instructed that the data being received merely includes the non-private data and limited via its protocol that remote processing system 280 is allowed to optimize its routines for both the short and long term processing and analytics. In one embodiment, notifications and/or instructions may be communicated using a couple of requests (e.g., HTTP/MQTT requests) from, for example, IoT gateway 305 to remote processing system 280. For example, the first request may inform remote processing system 280 that privacy filtering is taking place on an array of sensors due to privacy reasons and further, for logging purposes, provide a string describing its reasons. Another request informs remote processing system 280 that privacy filtering has now ended and provides any results of the local processing or computation to remote processing system 280.

Similarly, in one embodiment, at 323, any private portions of the sensed data are classified as private and processed locally, such as at computing device 100 of FIG. 2. In one embodiment, at 325, once the private data is processed and its results are obtained, another determination is made as to whether the results can be regarded as non-private or some of the non-private data may be extracted as non-private or at least there can be formed a set of non-private data points summarizing the results based on the local processing of the private data. If yes, at 325, any one or more of the partial non-private data, non-private results, and non-private data points may be transmitted over to be processed remotely at remote processing system 280. If not, all the private data may then be processed locally and any results of the processing may also remain local.

It is contemplated that any portions (e.g., private portion) of the original stream of data that is handled locally is performed to the extent of the capabilities of a local system (e.g., IoT gateway 305) at the local device, such as computing device 100. For example, results provided through configuration 303 may not be regarded as private and thus such results may be provided as a separate set of data to remote processing system 280 for analysis purposes. It is contemplated that this is not to be regarded as computation offloading in that the processing is different when performed locally and/or remotely. For example, a local IoT device, such as computing device 100, 270, etc., may be working on a limited CPU and memory compared to remote processing system 280 and thus, local processing may be performed in any number of ways, such as continuing with the speech example, the local processing may be used to detect how may persons are present in the room and how are they located even if the actual speech may not be processed due to performance issues. These local processing results may then be shared with remote processing system 280 if it is considered to be non-private or at least less sensitive than the original sensed data. This way, in one embodiment, any gains accomplished by the usage of remote processing system 280 in the processing chain are not lost, while simultaneously satisfying any privacy policies (such as a policy set by an IoT system's administrator), user preferences (such as a user preference set by a user of an IoT system), etc., and keeping any private data from external systems, such as remote processing system 280.

At 327, in one embodiment, any results of the remote processing of any non-private portions of the sensed data are then communicated back from remote processing system 280 to the corresponding local transmitting device, such as computing device 100 of FIG. 2.

Figure 4A:
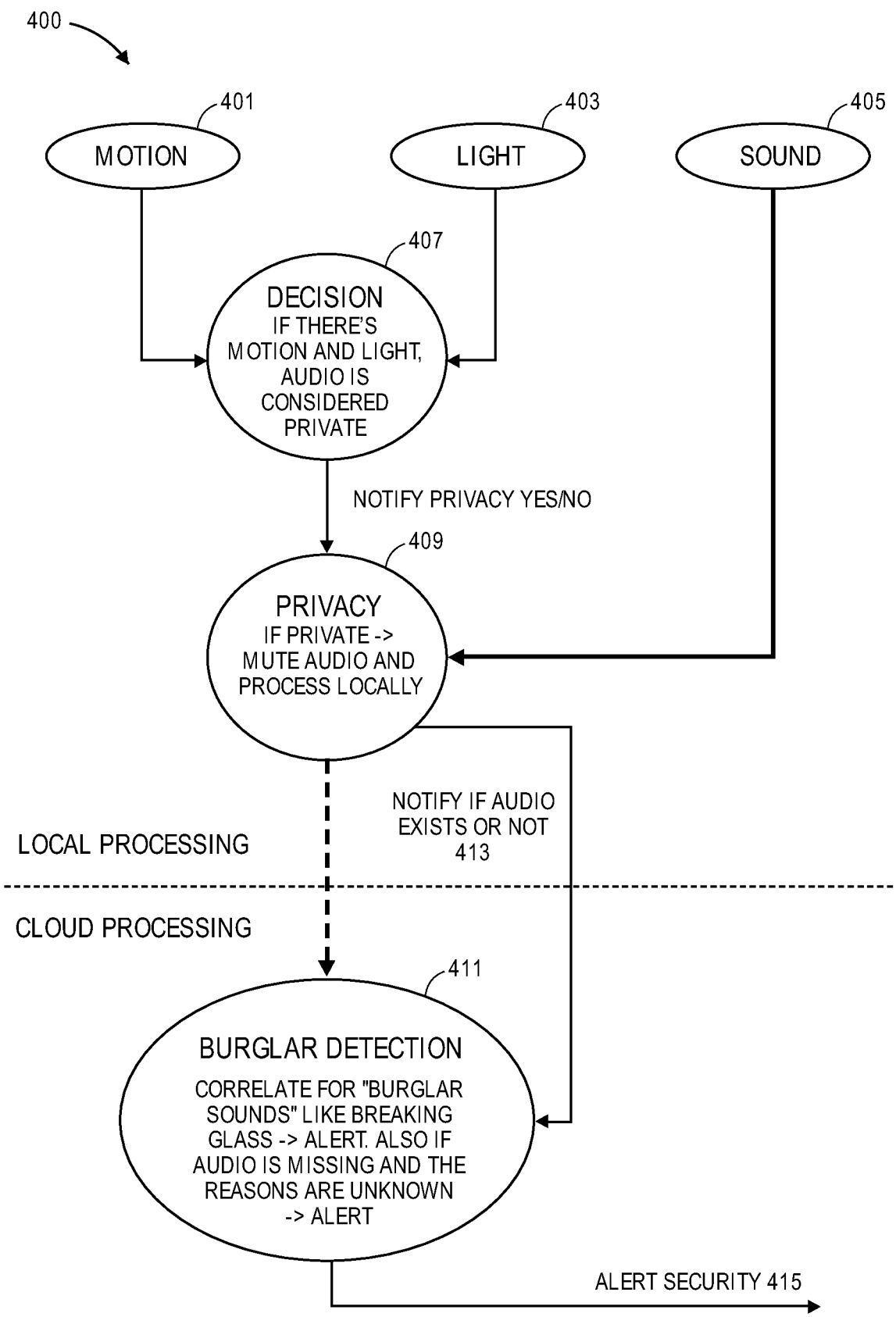
FIG. 4A illustrates a method for facilitating filtering and local/remote processing of data according to one embodiment.

FIG. 4A illustrates a method 400 for facilitating filtering and local/remote processing of data according to one embodiment. Transaction sequence 400 may be performed by processing logic that may comprise hardware (e.g., circuitry, dedicated logic, programmable logic, etc.), software (such as instructions run on a processing device), or a combination thereof. In one embodiment, transaction sequence 400 may be performed by smart data mechanism 110 of FIGS. 1-2. The processes of transaction sequence 400 are illustrated in linear sequences for brevity and clarity in presentation; however, it is contemplated that any number of them can be performed in parallel, asynchronously, or in different orders. For brevity, many of the details discussed with reference to the previous FIGS. 1-3 may not be discussed or repeated hereafter.

Method 400 begins at blocks 401, 403 and 405 with obtaining of data relating to motion, light, and sound/audio, respectively. As previously discussed with reference cross-domain processing, at block 407, a determination is made to whether the data collectively obtained from motion at block 401, light at block 403, and audio at block 405 contains any private data. For example, motion data from block 401 and light data from block 403 may be regarded and classified as non-private, but audio data from block 403 may be regarded and classified as private. In one embodiment, a local computing device (e.g., IoT device) is notified that the gathered data includes private data and accordingly, at block 409, with the audio data being classified as private and processed locally.

In one embodiment, at 413, upon detection of the audio data being private data, a remote processing system (e.g., cloud-based server computer) may be notified that, for example, the private audio exists but it is not included in the non-private data that is communicated on to the remote processing system over one or more networks, such as a cloud network. Further, in one embodiment, the audio data (e.g., habitants' voices) being classified as private, the private audio is muted (such as habitants' voices is muted) and thus prevented from being included in the non-private data that is transmitted over to the remote processing system for remote processing at block 411. For example, if the overall detected audio includes the burglar's voice and the habitants' voice, a cross-domain analysis, using movement and light sensors, may be performed to intelligently differentiate between the burglar's voice and the habitants' voices such that the habitants' voices may then be muted for privacy concerns. Also, at 415, if the audio is completely missing or the reason for the missing audio is unknown, an alert is nevertheless issued and, in one embodiment, this alert is forwarded on to relevant authorities (e.g., community security, police, hospital, etc.) so that an appropriate action may be taken.

It is contemplated that method 400 represents a use-case scenarios relating to a burglar/home security system. In this case, while the users (e.g., homeowners, habitants, etc., having access to the burglar/home security system, serving as an IoT computing device) are assured of their privacy being protected, a corresponding third-party service provider (e.g., agency/organization owning or having access to a remote processing system (e.g., cloud server)) benefits from saving power and performing better processing of data without having to process the added data (e.g., private data) from the local/target system (e.g., burglar/home security system) which, in turn, allows the service provider to make more reasonable decisions. For example, as illustrated, here at decision block 407, a determination is made as to whether any of the three inputs, 401, 403, 405, is secret or private and subsequently, marks the private data, such as audio from block 405, as private and decides not to send it to the remote processing system.

For example, this classification of the audio being private may be deduced from a scenario where there are people in a room if lights are on and motion sensor readings are also being obtained. If there are people in the room, any private conversation between those people may be regarded as private and not sent to the remote processing system over cloud. For example, when the microphone signal is muted, there may not be any point of performing a heavy correlation operation over cloud either. On the other hand, if there is no sound and there is a lack of knowledge with regard to why there is no sound, this silence may be regarded as a different situation that may be interpreted as a serious security issue (such as someone has disabled microphones). Keeping these two situations in mind, the remote processing system is likely to make an incorrect decision without an appropriate notification, but having received a notification, at 413, the remote processing system is expected to have valid data for making a informed and correct decision and not likely to make a wrong decision based on invalid data.

Figure 4B:
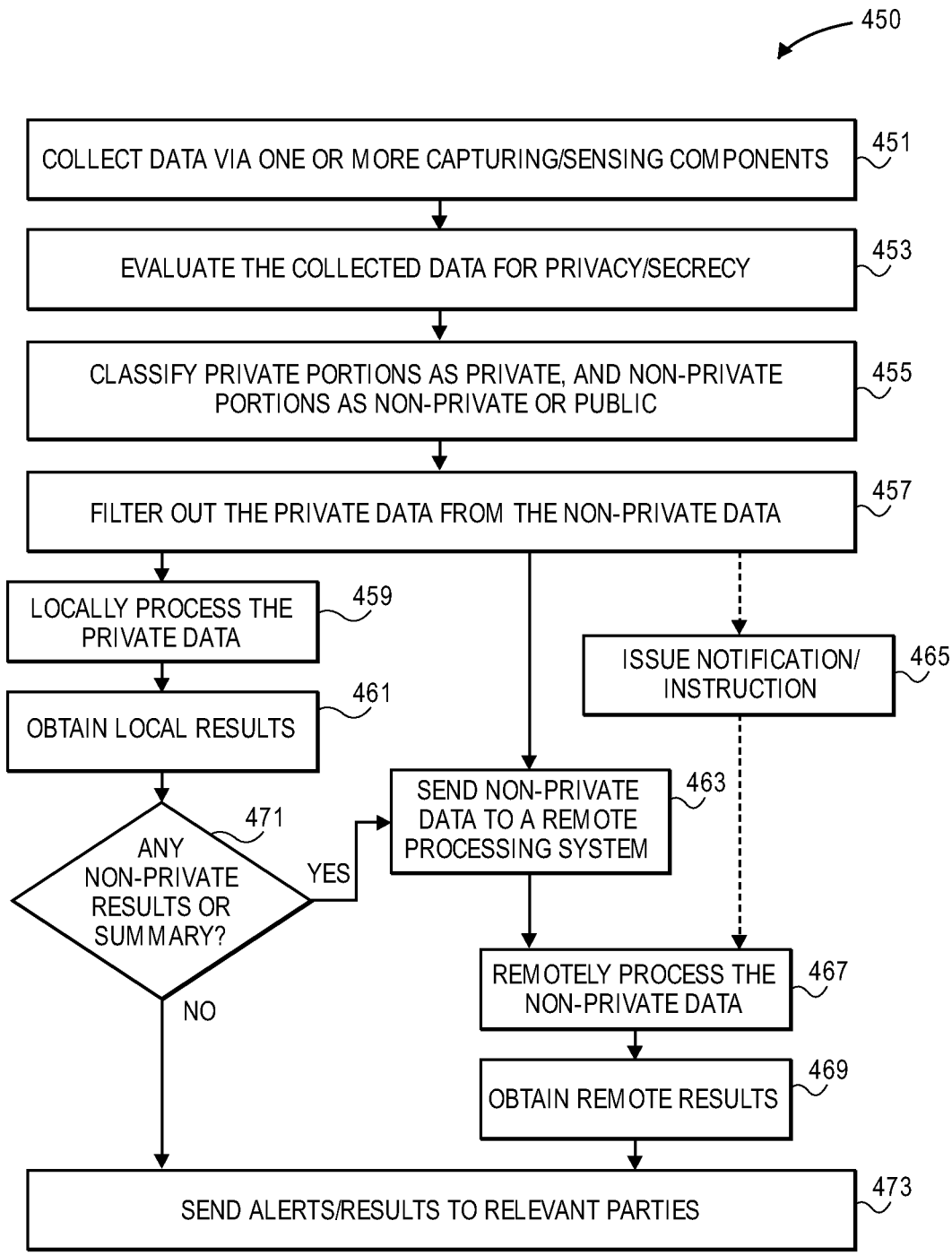
FIG. 4B illustrates a method for facilitating filtering and local/remote processing of data according to one embodiment.

FIG. 4B illustrates a method 450 for facilitating filtering and local/remote processing of data according to one embodiment. Transaction sequence 450 may be performed by processing logic that may comprise hardware (e.g., circuitry, dedicated logic, programmable logic, etc.), software (such as instructions run on a processing device), or a combination thereof. In one embodiment, transaction sequence 450 may be performed by smart data mechanism 110 of FIGS. 1-2. The processes of transaction sequence 450 are illustrated in linear sequences for brevity and clarity in presentation; however, it is contemplated that any number of them can be performed in parallel, asynchronously, or in different orders. For brevity, many of the details discussed with reference to previous FIGS. 1-4A may not be discussed or repeated hereafter.

Method 450 begins block 451 with collection of data using one or more capturing/sensing components, such as sensors, detectors, microphones, etc., communicatively associated with a computing device, such as an IoT device (e.g., home security system, etc.). At block 453, in one embodiment, the collected data is evaluated to determine various scenarios to further determine whether there are any portions of the data that may be regarded as private or secret, where the scenarios may range from type of components (e.g., movement detector, microphone, etc.), domains (e.g., video domain, audio domain, etc.), contents/data (e.g., scheduled movement, unscheduled movement, human speech, traffic noise, silence, etc.), events (e.g., silence when people present or absent, no movement when expected, movement when no one is home, etc.), and/or the like.

At block 455, those portions of the collected data that may be regarded as private or capable of revealing secret information may be classified as private, while other portions of the collected data may be classified as non-private or public. For example, a determination may be made as to whether there are any privacy or secrecy issues with any portions of the collected data, where the privacy/secrecy issues are examined based on one or more of governmental, service provider, manufacturer, and/or user-determined rules, policies, profiles, preferences, etc. At block 457, the private data may be filtered out or separated from the non-private data.

At block 459, in one embodiment, the private data is processed locally at the computing device and refrained from being sent to a remote processing system (e.g., third-party cloud server computer) over one or more networks/communication medium (e.g., cloud network, etc.). At block 461, results from this local processing of the private data are computed/obtained.

Referring back to block 457, at block 463, in one embodiment, the non-private data is transmitted over to the remote processing system over a communication medium for further processing. At block 465, a notification and/or a set of instructions may also be issued and communicated over to the remote processing system prior to or along with sending the non-private data or after the private data has been sent and received at the remote processing system. For example, the notification/instructions may indicate to the remote processing system that the non-private data does not represent the entire set of collected data because it is missing the private portion of the collected data. Further, referring back to block 455, if none of the portions of the collected data is classified as private, this notification/instructions may not be necessitated and thus neither issued nor transmitted. At block 467, the non-private data is remote processed at the remote processing system in light of any notification/instruction. At block 469, results from this remote processing of the non-private data are computed/obtained.

At block 471, in one embodiment, determinations are made as to whether: 1) contents of the local results are non-private; 2) the local private results can be summarized to include non-private information; and/or 3) the original private data includes any non-private portions. If yes to at least one of the three determinations, any non-private contents (e.g., non-private results, non-private summary of the private results, non-private portions of the private data, etc.) may be sent over to the remote processing system for remote processing of this non-private contents at block 463 and method 450 continues thereafter. If, however, there are no more non-private contents, based on the local results of block 461 and the remote results of block 469, an alert may be sent to the relevant parties, such as home security device company, police, hospital, ambulance, fire station, emergency contacts, friends, family, etc., so that appropriate actions may be taken. It is contemplated that the alert may be a short sound, an animation note, a textual message ranging from minimal details to maximum notification, etc.

Figure 5:
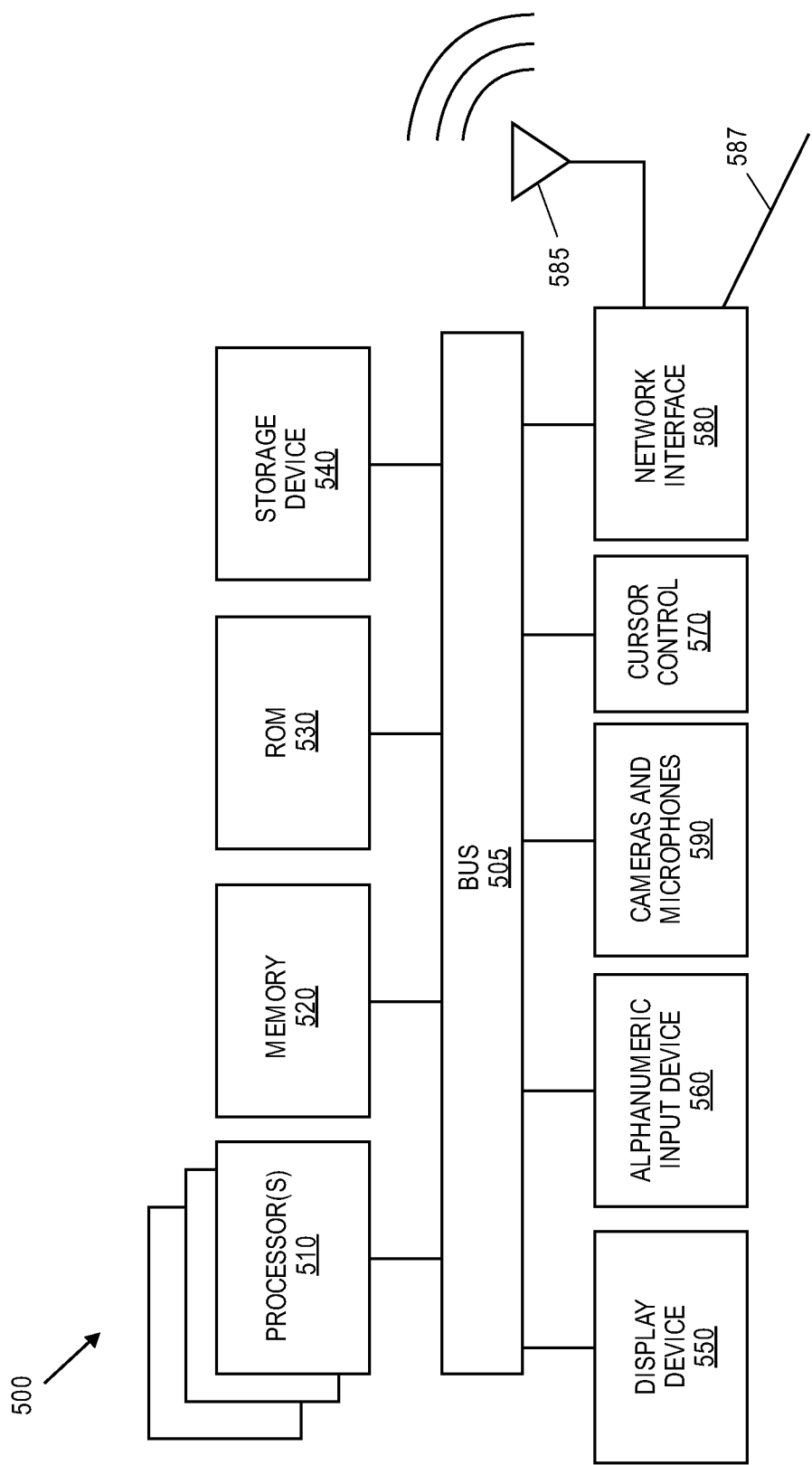
FIG. 5 illustrates computer environment suitable for implementing embodiments of the present disclosure according to one embodiment.

FIG. 5 illustrates an embodiment of a computing system 500 capable of supporting the operations discussed above. Computing system 500 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, wearable devices, etc. Alternate computing systems may include more, fewer and/or different components. Computing device 500 may be the same as or similar to or include computing devices 100 described in reference to FIG. 1.

Computing system 500 includes bus 505 (or, for example, a link, an interconnect, or another type of communication device or interface to communicate information) and processor 510 coupled to bus 505 that may process information. While computing system 500 is illustrated with a single processor, it may include multiple processors and/or co-processors, such as one or more of central processors, image signal processors, graphics processors, and vision processors, etc. Computing system 500 may further include random access memory (RAM) or other dynamic storage device 520 (referred to as main memory), coupled to bus 505 and may store information and instructions that may be executed by processor 510. Main memory 520 may also be used to store temporary variables or other intermediate information during execution of instructions by processor 510.

Computing system 500 may also include read only memory (ROM) and/or other storage device 530 coupled to bus 505 that may store static information and instructions for processor 510. Date storage device 540 may be coupled to bus 505 to store information and instructions. Date storage device 540, such as magnetic disk or optical disc and corresponding drive may be coupled to computing system 500.

Computing system 500 may also be coupled via bus 505 to display device 550, such as a cathode ray tube (CRT), liquid crystal display (LCD) or Organic Light Emitting Diode (OLED) array, to display information to a user. User input device 560, including alphanumeric and other keys, may be coupled to bus 505 to communicate information and command selections to processor 510. Another type of user input device 560 is cursor control 570, such as a mouse, a trackball, a touchscreen, a touchpad, or cursor direction keys to communicate direction information and command selections to processor 510 and to control cursor movement on display 550. Camera and microphone arrays 590 of computer system 500 may be coupled to bus 505 to observe gestures, record audio and video and to receive and transmit visual and audio commands.

Computing system 500 may further include network interface(s) 580 to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) 580 may include, for example, a wireless network interface having antenna 585, which may represent one or more antenna(e). Network interface(s) 580 may also include, for example, a wired network interface to communicate with remote devices via network cable 587, which may be, for example, an Ethernet cable, a coaxial cable, a fiber optic cable, a serial cable, or a parallel cable.

Network interface(s) 580 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 580 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 580 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 500 may vary from implementation to implementation depending upon numerous factors, such as price constraints, performance requirements, technological improvements, or other circumstances. Examples of the electronic device or computer system 500 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 6:
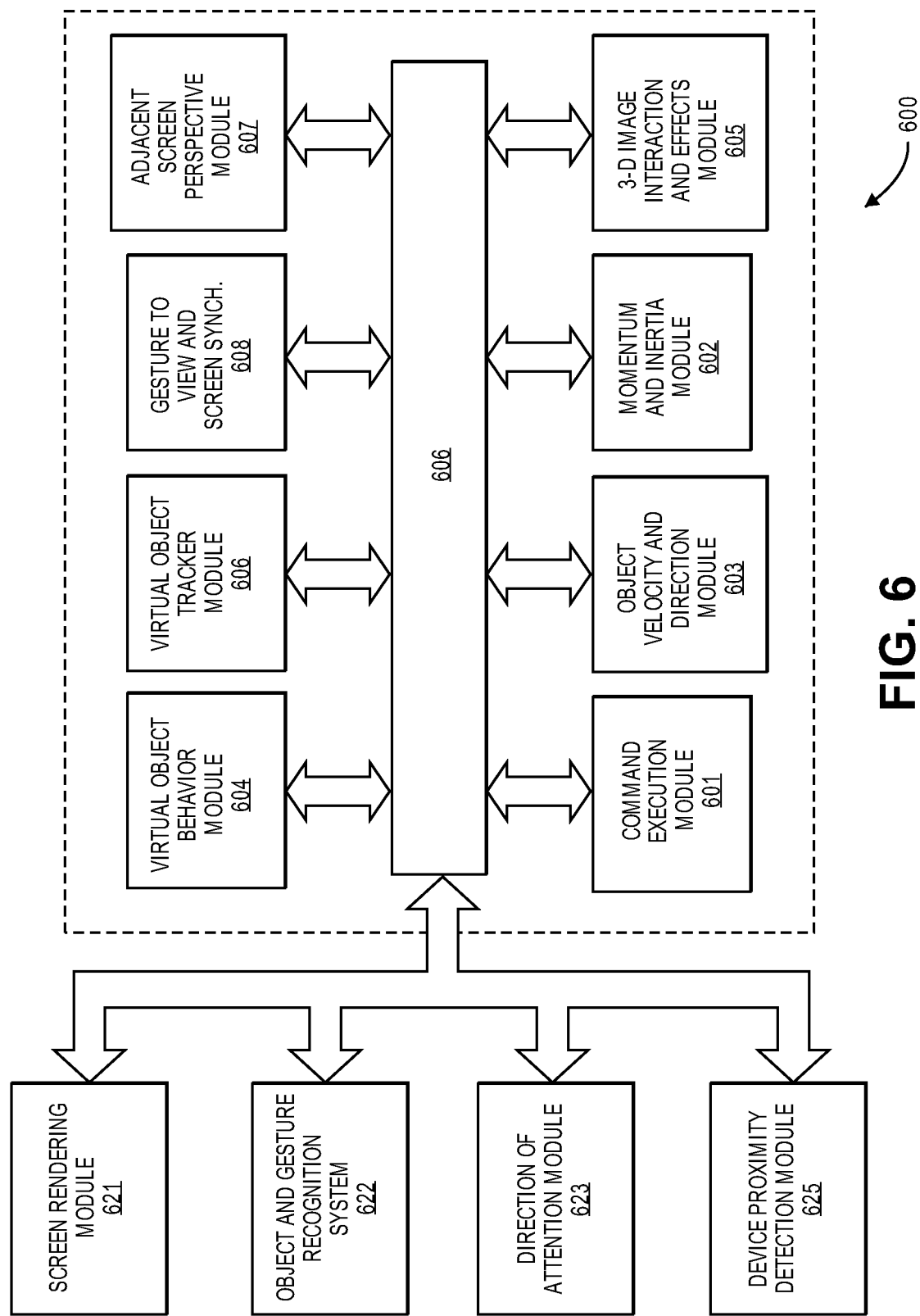
FIG. 6 illustrates a method for facilitating dynamic targeting of users and communicating of message according to one embodiment.

FIG. 6 illustrates an embodiment of a computing environment 600 capable of supporting the operations discussed above. The modules and systems can be implemented in a variety of different hardware architectures and form factors including that shown in FIG. 4.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition System 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition System 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition System 622. Various views of an application on one or more screens can be associated with alternative gesture libraries or a set of gesture templates for a given view. As an example in FIG. 1A a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual object's across screens. The Adjacent Screen Perspective Module may further allow the position of the screens to be correlated to a model of three-dimensional space representing all of the existing objects and virtual objects.

The Object Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition System 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate smart filtering and local/remote processing of data, comprising: detection/reception logic to detect data collected via one or more sensing components; evaluation/classification logic to evaluate the collected data to identify one or more portions of the collected data having privacy relevance, wherein the evaluation/classification logic is further to classify the one or more portions as private data, wherein the evaluation classification logic is further classify other portions of the collected as non-private data; filtering logic to filter out the private data from the non-private data of the collected data; and communication/compatibility logic to facilitate processing of the private data at the apparatus, wherein the non-private data is transmitted to a computing device over a network.

Example 2 includes the subject matter of Example 1, further comprising rules and criteria logic to offer rules and criteria based on at least one of laws, policies, user profiles, and preferences, wherein the laws include one or more of national laws, provincial laws, and local laws, wherein the policies include one or more of governmental policies, third-party service provider policies, company policies, and system policies, wherein the user profiles relate to one or more users having access to the apparatus, wherein the preferences include at least one of user preferences and service provider preferences.

Example 3 includes the subject matter of Example 1 or 2, further comprising notification/instruction logic to generate a notification to be transmitted to the computing device, wherein the notification is transmitted to the computing device in close proximity of the transmission of the non-private data to alert the computing device of missing of the private data, wherein the non-private data is remotely processed at the computing device.

Example 4 includes the subject matter of Example 1, wherein the evaluation/classification logic is further to evaluate results of processing of the private data to determine non-private contents of the results Example 5 includes the subject matter of Example 1 or 4, wherein the filtering logic is further to filter out the non-private contents from private contents of the results, and wherein communication/compatibility logic is further to transmit the non-private contents of the results to the computing device over the network, wherein the non-private contents are processed remotely at the computing device.

Example 6 includes the subject matter of Example 1, wherein the private data is classified based on at least one of one or more types of the one or more sensing components, the rules and criteria, one or more domains, and one or more scenarios.

Example 7 includes the subject matter of Example 1 or 6, wherein the one or more types of the one or more sensing components comprise at least one of a sensor, a detector, a microphone, and a camera, wherein the one or more domains comprise at least one of a movement domain, an audio domain, and a video domain, wherein the privacy data is detected over one or more of the domains, wherein the one or more scenarios include at least one of a predefined event, an unusual occurrence, and an emergency.

Example 8 includes the subject matter of Example 1, wherein the apparatus includes at least one of an Internet of Things (IoT) devices, wearable devices, mobile computing devices, and laptop computers, wherein the IoT devices includes one or more of smart household devices, smart office devices, smart medical devices, smart police devices, smart traffic devices, smart vehicle devices, smart building devices, and smart scientific devices.

Example 9 includes the subject matter of Example 1, wherein the computing device comprises a remote data processing device including a cloud-based server computer accessible over the network, wherein the network includes at least one of a cloud network and the Internet.

Some embodiments pertain to Example 10 that includes a method for facilitating smart filtering and local/remote processing of data, comprising: detecting data collected via one or more sensing components; evaluating the collected data to identify one or more portions of the collected data having privacy relevance, wherein evaluating further includes classifying the one or more portions as private data and other portions of the collected as non-private data; filtering out the private data from the non-private data of the collected data; and processing the private data, wherein the non-private data is transmitted to a remote computing device over a network.

Example 11 includes the subject matter of Example 10, further comprising offering rules and criteria based on at least one of laws, policies, user profiles, and preferences, wherein the laws include one or more of national laws, provincial laws, and local laws, wherein the policies include one or more of governmental policies, third-party service provider policies, company policies, and system policies, wherein the private data is processed at a local computing device and wherein the user profiles relate to one or more users having access to the local computing device, wherein the preferences include at least one of user preferences and service provider preferences.

Example 12 includes the subject matter of Example 10 or 11, further comprising generating a notification to be transmitted to the remote computing device, wherein the notification is transmitted to the remote computing device in close proximity of the transmission of the non-private data to alert the remote computing device of missing of the private data, wherein the non-private data is remotely processed at the remote computing device.

Example 13 includes the subject matter of Example 10, wherein evaluating further comprises evaluating results of processing of the private data to determine non-private contents of the results.

Example 14 includes the subject matter of Example 10 or 13, wherein filtering out further comprises filtering out the non-private contents from private contents of the results, and wherein transmitting further comprises transmitting the non-private contents of the results to the remote computing device over the network, wherein the non-private contents are processed remotely at the remote computing device.

Example 15 includes the subject matter of Example 10, wherein the private data is classified based on at least one of one or more types of the one or more sensing components, the rules and criteria, one or more domains, and one or more scenarios.

Example 16 includes the subject matter of Example 10 or 15, wherein the one or more types of the one or more sensing components comprise at least one of a sensor, a detector, a microphone, and a camera, wherein the one or more domains comprise at least one of a movement domain, an audio domain, and a video domain, wherein the privacy data is detected over one or more of the domains, wherein the one or more scenarios include at least one of a predefined event, an unusual occurrence, and an emergency.

Example 17 includes the subject matter of Example 10, wherein the local computing device includes at least one of an Internet of Things (IoT) devices, wearable devices, mobile computing devices, and laptop computers, wherein the IoT devices includes one or more of smart household devices, smart office devices, smart medical devices, smart police devices, smart traffic devices, smart vehicle devices, smart building devices, and smart scientific devices.

Example 18 includes the subject matter of Example 10, wherein the remote computing device comprises a remote data processing device including a cloud-based server computer accessible over the network, wherein the network includes at least one of a cloud network and the Internet.

Some embodiments pertain to Example 19 includes a system comprising a storage device having instructions, and a processor to execute the instructions to facilitate a mechanism to perform one or more operations comprising: detecting data collected via one or more sensing components; evaluating the collected data to identify one or more portions of the collected data having privacy relevance, wherein evaluating further includes classifying the one or more portions as private data and other portions of the collected as non-private data; filtering out the private data from the non-private data of the collected data; and processing the private data, wherein the non-private data is transmitted to a remote computing device over a network.

Example 20 includes the subject matter of Example 19, wherein the one or more operations comprise offering rules and criteria based on at least one of laws, policies, user profiles, and preferences, wherein the laws include one or more of national laws, provincial laws, and local laws, wherein the policies include one or more of governmental policies, third-party service provider policies, company policies, and system policies, wherein the private data is processed at a local computing device and wherein the user profiles relate to one or more users having access to the local computing device, wherein the preferences include at least one of user preferences and service provider preferences.

Example 21 includes the subject matter of Example 19 or 20, wherein the one or more operations comprise generating a notification to be transmitted to the remote computing device, wherein the notification is transmitted to the remote computing device in close proximity of the transmission of the non-private data to alert the remote computing device of missing of the private data, wherein the non-private data is remotely processed at the remote computing device.

Example 22 includes the subject matter of Example 19, wherein evaluating further comprises evaluating results of processing of the private data to determine non-private contents of the results.

Example 23 includes the subject matter of Example 19 or 22, wherein filtering out further comprises filtering out the non-private contents from private contents of the results, and wherein transmitting further comprises transmitting the non-private contents of the results to the remote computing device over the network, wherein the non-private contents are processed remotely at the remote computing device.

Example 24 includes the subject matter of Example 19, wherein the private data is classified based on at least one of one or more types of the one or more sensing components, the rules and criteria, one or more domains, and one or more scenarios.

Example 25 includes the subject matter of Example 19 or 24, wherein the one or more types of the one or more sensing components comprise at least one of a sensor, a detector, a microphone, and a camera, wherein the one or more domains comprise at least one of a movement domain, an audio domain, and a video domain, wherein the privacy data is detected over one or more of the domains, wherein the one or more scenarios include at least one of a predefined event, an unusual occurrence, and an emergency.

Example 26 includes the subject matter of Example 19, wherein the local computing device includes at least one of an Internet of Things (IoT) devices, wearable devices, mobile computing devices, and laptop computers, wherein the IoT devices includes one or more of smart household devices, smart office devices, smart medical devices, smart police devices, smart traffic devices, smart vehicle devices, smart building devices, and smart scientific devices.

Example 27 includes the subject matter of Example 19, wherein the remote computing device comprises a remote data processing device including a cloud-based server computer accessible over the network, wherein the network includes at least one of a cloud network and the Internet.

Some embodiments pertain to Example 28 includes an apparatus comprising: means for detecting a gesture initiated by a sending user having access to a computing device; means for detecting data collected via one or more sensing components; means for evaluating the collected data to identify one or more portions of the collected data having privacy relevance, wherein evaluating further includes classifying the one or more portions as private data and other portions of the collected as non-private data; means for filtering out the private data from the non-private data of the collected data; and means for processing the private data, wherein the non-private data is transmitted to a remote computing device over a network.

Example 29 includes the subject matter of Example 28, further comprising means for offering rules and criteria based on at least one of laws, policies, user profiles, and preferences, wherein the laws include one or more of national laws, provincial laws, and local laws, wherein the policies include one or more of governmental policies, third-party service provider policies, company policies, and system policies, wherein the private data is processed at a local computing device and wherein the user profiles relate to one or more users having access to the local computing device, wherein the preferences include at least one of user preferences and service provider preferences.

Example 30 includes the subject matter of Example 28 or 29, further comprising means for generating a notification to be transmitted to the remote computing device, wherein the notification is transmitted to the remote computing device in close proximity of the transmission of the non-private data to alert the remote computing device of missing of the private data, wherein the non-private data is remotely processed at the remote computing device.

Example 31 includes the subject matter of Example 28, wherein the means for evaluating further comprises means for evaluating results of processing of the private data to determine non-private contents of the results.

Example 32 includes the subject matter of Example 28 or 31, wherein the means for filtering out further comprises means for filtering out the non-private contents from private contents of the results, and wherein transmitting further comprises transmitting the non-private contents of the results to the remote computing device over the network, wherein the non-private contents are processed remotely at the remote computing device.

Example 33 includes the subject matter of Example 28, wherein the private data is classified based on at least one of one or more types of the one or more sensing components, the rules and criteria, one or more domains, and one or more scenarios.

Example 34 includes the subject matter of Example 28 or 33, wherein the one or more types of the one or more sensing components comprise at least one of a sensor, a detector, a microphone, and a camera, wherein the one or more domains comprise at least one of a movement domain, an audio domain, and a video domain, wherein the privacy data is detected over one or more of the domains, wherein the one or more scenarios include at least one of a predefined event, an unusual occurrence, and an emergency.

Example 35 includes the subject matter of Example 28, wherein the local computing device includes at least one of an Internet of Things (IoT) devices, wearable devices, mobile computing devices, and laptop computers, wherein the IoT devices includes one or more of smart household devices, smart office devices, smart medical devices, smart police devices, smart traffic devices, smart vehicle devices, smart building devices, and smart scientific devices.

Example 36 includes the subject matter of Example 28, wherein the remote computing device comprises a remote data processing device including a cloud-based server computer accessible over the network, wherein the network includes at least one of a cloud network and the Internet.

Example 37 includes at least one non-transitory or tangible machine-readable medium comprising a plurality of instructions, when executed on a computing device, to implement or perform a method as claimed in any of claims or examples 10-18.

Example 38 includes at least one machine-readable medium comprising a plurality of instructions, when executed on a computing device, to implement or perform a method as claimed in any of claims or examples 10-18.

Example 39 includes a system comprising a mechanism to implement or perform a method as claimed in any of claims or examples 10-18.

Example 40 includes an apparatus comprising means for performing a method as claimed in any of claims or examples 10-18.

Example 41 includes a computing device arranged to implement or perform a method as claimed in any of claims or examples 10-18.

Example 42 includes a communications device arranged to implement or perform a method as claimed in any of claims or examples 10-18.

Example 43 includes at least one machine-readable medium comprising a plurality of instructions, when executed on a computing device, to implement or perform a method or realize an apparatus as claimed in any preceding claims or examples.

Example 44 includes at least one non-transitory or tangible machine-readable medium comprising a plurality of instructions, when executed on a computing device, to implement or perform a method or realize an apparatus as claimed in any preceding claims or examples.

Example 45 includes a system comprising a mechanism to implement or perform a method or realize an apparatus as claimed in any preceding claims or examples.

Example 46 includes an apparatus comprising means to perform a method as claimed in any preceding claims or examples.

Example 47 includes a computing device arranged to implement or perform a method or realize an apparatus as claimed in any preceding claims or examples.

Example 48 includes a communications device arranged to implement or perform a method or realize an apparatus as claimed in any preceding claims or examples.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   a computing device including at least a processor, memory, and storage, wherein the processor can execute software instructions stored in the memory or the storage, the software instructions including:
   detection/reception logic to detect data collected via one or more sensing components communicatively coupled to the processor and operating in multiple domains;
   evaluation/classification logic to evaluate the collected data from sensing components in at least two of the multiple domains to identify one or more portions of the collected data having privacy relevance, wherein the evaluation/classification logic is further to classify the one or more portions as private data, wherein the evaluation classification logic is further to classify other portions of the collected as non-private data;
   filtering logic to filter out the private data from the non-private data of the collected data; and
   communication/compatibility logic to facilitate processing of the private data at the apparatus, wherein the non-private data is transmitted to a remote computing device over a network.

2. The apparatus of claim 1, further comprising rules and criteria logic to offer rules and criteria based on at least one of laws, policies, user profiles, and preferences, wherein the laws include one or more of national laws, provincial laws, and local laws, wherein the policies include one or more of governmental policies, third-party service provider policies, company policies, and system policies, wherein the user profiles relate to one or more users having access to the apparatus, wherein the preferences include at least one of user preferences and service provider preferences.

3. The apparatus of claim 1, further comprising notification/instruction logic to generate a notification to be transmitted to the computing device, wherein the notification is transmitted to the computing device in close proximity of the transmission of the non-private data to alert the computing device of missing of the private data, wherein the non-private data is remotely processed at the computing device.

4. The apparatus of claim 1, wherein the evaluation/classification logic is further to evaluate results of processing of the private data to determine non-private contents of the results.

5. The apparatus of claim 4, wherein the filtering logic is further to filter out the non-private contents from private contents of the results, and
   wherein communication/compatibility logic is further to transmit the non-private contents of the results to the computing device over the network, wherein the non-private contents are processed remotely at the computing device.

6. The apparatus of claim 1, wherein the private data is classified based on at least one of one or more types of the one or more sensing components, the rules and criteria, and one or more scenarios.

7. The apparatus of claim 6, wherein the one or more types of the one or more sensing components comprise at least one of a sensor, a detector, a microphone, and a camera, wherein the multiple domains comprise at least two of a movement domain, an audio domain, and a video domain, wherein the privacy data is detected over two or more of the domains, wherein the one or more scenarios include at least one of a predefined event, an unusual occurrence, and an emergency.

8. The apparatus of claim 1, wherein the apparatus includes at least one of an Internet of Things (IoT) devices, wearable devices, mobile computing devices, and laptop computers, wherein the IoT devices includes one or more of smart household devices, smart office devices, smart medical devices, smart police devices, smart traffic devices, smart vehicle devices, smart building devices, and smart scientific devices.

9. The apparatus of claim 1, wherein the computing device comprises a remote data processing device including a cloud-based server computer accessible over the network, wherein the network includes at least one of a cloud network and the Internet.

10. A method comprising:
    detecting data collected via one or more sensing components communicatively coupled to a processor and operating in multiple domains, wherein the processor is coupled to a memory and storage, wherein the processor can execute software instructions stored in the memory or the storage, the software instructions including instructions for:
        evaluating the collected data from sensing components in at least two of the multiple domains to identify one or more portions of the collected data having privacy relevance, wherein evaluating further includes classifying the one or more portions as private data and other portions of the collected as non-private data;
        filtering out the private data from the non-private data of the collected data; and
        processing the private data, wherein the non-private data is transmitted to a remote computing device over a network.

11. The method of claim 10, further comprising offering rules and criteria based on at least one of laws, policies, user profiles, and preferences, wherein the laws include one or more of national laws, provincial laws, and local laws, wherein the policies include one or more of governmental policies, third-party service provider policies, company policies, and system policies, wherein the private data is processed at a local computing device and wherein the user profiles relate to one or more users having access to the local computing device, wherein the preferences include at least one of user preferences and service provider preferences.

12. The method of claim 10, further comprising generating a notification to be transmitted to the remote computing device, wherein the notification is transmitted to the remote computing device in close proximity of the transmission of the non-private data to alert the remote computing device of missing of the private data, wherein the non-private data is remotely processed at the remote computing device.

13. The method of claim 10, wherein evaluating further comprises evaluating results of processing of the private data to determine non-private contents of the results.

14. The method of claim 13, wherein filtering out further comprises filtering out the non-private contents from private contents of the results, and
    wherein transmitting further comprises transmitting the non-private contents of the results to the remote computing device over the network, wherein the non-private contents are processed remotely at the remote computing device.

15. The method of claim 10, wherein the private data is classified based on at least one of one or more types of the one or more sensing components, the rules and criteria, one or more domains, and one or more scenarios.

16. The method of claim 15, wherein the one or more types of the one or more sensing components comprise at least one of a sensor, a detector, a microphone, and a camera, wherein the multiple domains comprise at least two of a movement domain, an audio domain, and a video domain, wherein the privacy data is detected over two or more of the domains, wherein the one or more scenarios include at least one of a predefined event, an unusual occurrence, and an emergency.

17. The method of claim 10, wherein the local computing device includes at least one of an Internet of Things (IoT) devices, wearable devices, mobile computing devices, and laptop computers, wherein the IoT devices includes one or more of smart household devices, smart office devices, smart medical devices, smart police devices, smart traffic devices, smart vehicle devices, smart building devices, and smart scientific devices.

18. The method of claim 10, wherein the remote computing device comprises a remote data processing device including a cloud-based server computer accessible over the network, wherein the network includes at least one of a cloud network and the Internet.

19. At least one non-transitory machine-readable medium comprising a plurality of instructions that when executed on a computing device including a processor, memory, and storage, cause the processor to perform one or more operations comprising:
    detecting data collected via one or more sensing components operating in multiple domains;
    evaluating the collected data from sensing components in at least two of the multiple domains to identify one or more portions of the collected data having privacy relevance, wherein evaluating further includes classifying the one or more portions as private data and other portions of the collected as non-private data;
    filtering out the private data from the non-private data of the collected data; and
    transmitting the non-private data to a remote computing device over a network, wherein the private data is processed at a local computing device.

20. The non-transitory machine-readable medium of claim 19, further comprising offering rules and criteria based on at least one of laws, policies, user profiles, and preferences, wherein the laws include one or more of national laws, provincial laws, and local laws, wherein the policies include one or more of governmental policies, third-party service provider policies, company policies, and system policies, wherein the private data is processed at a local computing device and wherein the user profiles relate to one or more users having access to the local computing device, wherein the preferences include at least one of user preferences and service provider preferences.

21. The non-transitory machine-readable medium of claim 19, further comprising generating a notification to be transmitted to the remote computing device, wherein the notification is transmitted to the remote computing device in close proximity of the transmission of the non-private data to alert the remote computing device of missing of the private data, wherein the non-private data is remotely processed at the remote computing device.

22. The non-transitory machine-readable medium of claim 19, wherein evaluating further comprises evaluating results of processing of the private data to determine non-private contents of the results.

23. The non-transitory machine-readable medium of claim 22, wherein filtering out further comprises filtering out the non-private contents from private contents of the results, and
wherein transmitting further comprises transmitting the non-private contents of the results to the remote computing device over the network, wherein the non-private contents are processed remotely at the remote computing device.

24. The non-transitory machine-readable medium of claim 19, wherein the private data is classified based on at least one of one or more types of the one or more sensing components, the rules and criteria, one or more domains, and one or more scenarios.

25. The non-transitory machine-readable medium of claim 24, wherein the one or more types of the one or more sensing components comprise at least one of a sensor, a detector, a microphone, and a camera, wherein the multiple domains comprise at least two of a movement domain, an audio domain, and a video domain, wherein the privacy data is detected over two or more of the domains, wherein the one or more scenarios include at least one of a predefined event, an unusual occurrence, and an emergency,
wherein the local computing device includes at least one of an Internet of Things (IoT) devices, wearable devices, mobile computing devices, and laptop computers, wherein the IoT devices includes one or more of smart household devices, smart office devices, smart medical devices, smart police devices, smart traffic devices, smart vehicle devices, smart building devices, and smart scientific devices,
wherein the remote computing device comprises a remote data processing device including a cloud-based server computer accessible over the network, wherein the network includes at least one of a cloud network and the Internet.

* * * * *